(12) United States Patent
Alexander et al.

(10) Patent No.: US 6,640,230 B1
(45) Date of Patent: Oct. 28, 2003

(54) CALENDAR-DRIVEN APPLICATION TECHNIQUE FOR PREPARING RESPONSES TO INCOMING EVENTS

(75) Inventors: Geoffrey D. Alexander, Chapel Hill, NC (US); J. Smith Doss, Raleigh, NC (US); Renee M. Kovales, Cary, NC (US); David M. Ogle, Cary, NC (US); Diane P. Pozefsky, Chapel Hill, NC (US); Robert J. Sundstrom, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 09/671,001

(22) Filed: Sep. 27, 2000

(51) Int. Cl.[7] .................................................. G06F 17/30
(52) U.S. Cl. ........................................... 707/10; 707/102
(58) Field of Search .............................. 707/1–10, 102

(56) References Cited

U.S. PATENT DOCUMENTS

| | | | | |
|---|---|---|---|---|
| 4,807,154 A | * | 2/1989 | Scully et al. | 345/751 |
| 4,807,155 A | * | 2/1989 | Cree et al. | 345/733 |
| 4,831,552 A | * | 5/1989 | Scully et al. | 345/751 |
| 4,965,743 A | * | 10/1990 | Malin et al. | 706/45 |
| 4,977,520 A | * | 12/1990 | McGaughey et al. | 345/753 |
| 5,070,470 A | * | 12/1991 | Scully et al. | 708/112 |
| 5,428,784 A | * | 6/1995 | Cahill, Jr. | 709/206 |
| 5,528,745 A | * | 6/1996 | King et al. | 345/753 |
| 5,611,050 A | | 3/1997 | Theimer et al. | |
| 5,634,100 A | * | 5/1997 | Capps | 705/9 |
| 5,732,399 A | * | 3/1998 | Katiyar et al. | 705/8 |
| 5,796,394 A | | 8/1998 | Wicks et al. | |
| 5,835,762 A | | 11/1998 | Gans et al. | |
| 5,842,009 A | * | 11/1998 | Borovoy et al. | 707/1 |
| 5,855,006 A | * | 12/1998 | Huemoeller et al. | 705/9 |
| 5,867,822 A | * | 2/1999 | Sankar | 705/8 |
| 5,899,979 A | * | 5/1999 | Miller et al. | 705/9 |
| 6,006,227 A | * | 12/1999 | Freeman et al. | 707/7 |
| 6,016,478 A | | 1/2000 | Zhang et al. | |
| 6,034,683 A | * | 3/2000 | Mansour et al. | 345/764 |

(List continued on next page.)

OTHER PUBLICATIONS

Russell Borland, "Running Microsoft Outlook 97", Microsoft Press, Select Edition, p. 44.*
IBM Technical Disclosure Bulletin, "Reply–After Dates for Mail Surrogates", vol. 34 No. 8, Jan. 1992.

Primary Examiner—Safet Metjahic
Assistant Examiner—Hauh Thai
(74) Attorney, Agent, or Firm—Jeanine Ray-Yarletts; Marcia L. Doubet

(57) ABSTRACT

The present invention provides a method, system, and computer program product for using calendar events for users of electronic calendaring systems to prepare customized responses to incoming events (such as incoming electronic mail, voice calls, instant messages, etc.), where the response supplies information pertaining to the user. Electronic calendars are analyzed, and information from this analysis is stored in advance of detecting an incoming message. The stored information can then be used to quickly generate a response when a message does arrive. A multi-level hierarchy of calendar events is used, where a top level of the hierarchy is used for context events which have a relatively long duration and a lower level of the hierarchy is used for specific events which occur during context events. The calendar user may specify attribute values such as how the user can be reached; whether, and how often, the user checks his e-mail or voice mail; etc. Attribute values are hierarchically coalesced. Overrides may be provided, enabling a user to fine-tune his preferences. Use of the present invention enables other persons trying to contact a calendar owner to be informed of the calendar owner's status and other information, without requiring the calendar owner to manually change configuration settings of his e-mail or greetings of his voice mail, etc. The techniques disclosed herein are also applicable to other scenarios such as project management.

49 Claims, 15 Drawing Sheets

U.S. PATENT DOCUMENTS

| | | | | |
|---|---|---|---|---|
| 6,035,321 A | * | 3/2000 | Mays | 709/103 |
| 6,065,012 A | * | 5/2000 | Balsara et al. | 707/102 |
| 6,104,788 A | * | 8/2000 | Shaffer et al. | 379/93.17 |
| 6,313,852 B1 | * | 11/2001 | Ishizaki et al. | 345/751 |
| 6,327,343 B1 | * | 12/2001 | Epstein et al. | 379/88.01 |
| 6,360,252 B1 | * | 3/2002 | Rudy et al. | 709/206 |
| 6,369,840 B1 | * | 4/2002 | Barnett et al. | 345/853 |
| 6,370,554 B1 | * | 4/2002 | Sun-Woo | 708/112 |
| 6,380,959 B1 | * | 4/2002 | Wang et al. | 345/853 |
| 6,457,045 B1 | * | 9/2002 | Hanson et al. | 709/206 |
| 6,463,463 B1 | * | 10/2002 | Godfrey et al. | 709/206 |
| 6,466,236 B1 | * | 10/2002 | Pivowar et al. | 345/835 |
| 6,480,830 B1 | * | 11/2002 | Ford et al. | 705/9 |
| 6,480,885 B1 | * | 11/2002 | Olivier | 709/207 |

* cited by examiner

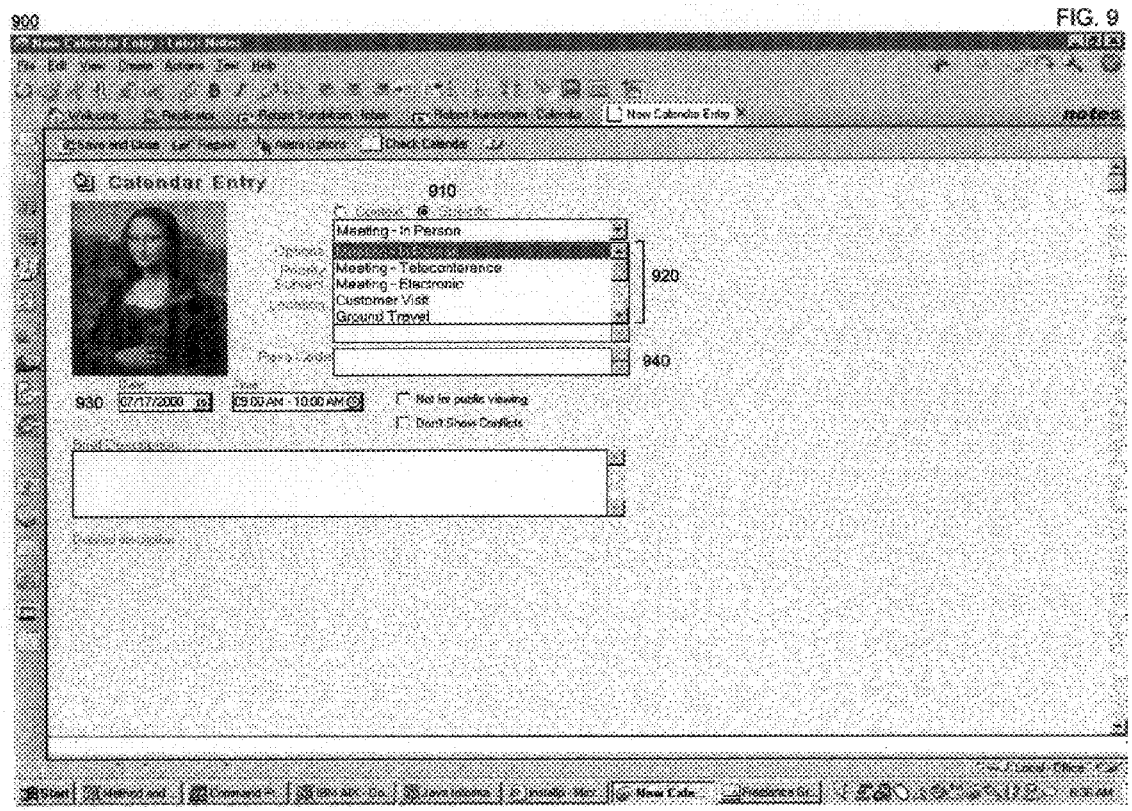

To: Jane Smith/Raleigh/IBM@IBMUS
From: Tom Johnson/Raleigh/IBM@IBMUS
1010 Subject: Johnson, T.B. (Tom) is not available until Friday 07/20/00 at 04:00 PM. (checking e-mail)
                                   1020                                    1030

Status
1040   1050                       1060
I am out of the office until 07/20/00 at 04:00 PM. While I am away, I check e-mail within 24 hours.
For current contact information call my office phone number listed below.

1070 Personal Message
I am at the Focus Group Session

1080 Alternate Means of Contact
  Instant Messaging............ xxyyzz@us.ibm.com on Sametime Connect
  Fax............................ 770-999-9999
  Office Phone................. 919-555-4444
  Cellular Phone............... 919-444-5555
  Pager/SMS.................... 800-333-4455 (Pager Type: Alphanumeric)
  Pager/SMS E-mail Address.... 9999999@skytel.com 1090 Alternate Contact Person
My alternate contact is my secretary, Jones, Mary at 1-919-555-5555.

Robert Sundstrom is [out of the office and plans to return]₁₁₃₀
1120— July 24th at 8 a.m. He will be checking for messages
while he is away. He normally checks voice mail twice
a day.

To leave a message press 1. To speak with his backup ⌐1140
press 2. For [immediate contact information,] press 3.
To be connected with the site telephone operator
press 9.
          1150

FIG. 14

| 1405 | 1410 | 1415 | 1420 | 1425 | 1430 | 1435 | 1440 |
|---|---|---|---|---|---|---|---|
| Mona | 19195559889 | 9657768400 | 9658224200 | 0 | 0 | 1 | 1 |
| Mona | 19195559889 | 9658224200 | 9658854800 | 0 | 0 | 2 | 1 |
| Mona | 19195559889 | 9658854800 | 9659910600 | 1 | 2 | 0 | 0 |
| Mona | 19195559889 | 9659910600 | 9659941200 | 1 | 2 | 2 | 1 |
| Mona | 19195559889 | 9659941200 | 9659998800 | 1 | 1 | 2 | 1 |

1400

CALENDAR-DRIVEN APPLICATION TECHNIQUE FOR PREPARING RESPONSES TO INCOMING EVENTS

RELATED INVENTION

The present invention is related to application, titled "Calendar Events and Calendar-Driven Application Technique" (Ser. No. 09/670,844), filed concurrently herewith. This related invention is commonly assigned to International Business Machines Corporation (IBM), and is hereby incorporated herein by reference.

BACKGROUND OF THE INVENTION

1. Field of the Invention

The present invention relates to a computer system, and deals more particularly with a method, system, and computer program product for using calendar events that have been created by users of computer systems to prepare customized responses to incoming events (such as incoming electronic mail, voice calls, etc.), where the response supplies information pertaining to the user.

2. Description of the Related Art

Calendars, and electronic calendars in particular, often contain a wealth of information about their owner. For example, an individual may use an electronic calendar to maintain information about his work schedule, his meetings and other appointments, his vacation and business travel plans (including when he will be away, which flights or other transportation he will use, where he can be reached while away, who he may visit while away, etc.), phone calls that need to be made at particular times, and so forth. Examples of electronic calendaring systems include Microsoft Outlook® 2000 and Lotus Organizer®, which also allows a user to create entries on his calendar for other people. For example, a secretary might have calendar entries for his own schedule, but also keep information about his manager's appointments on his own calendar as well. Such systems are quite popular among users. ("Outlook" is a registered trademark of Microsoft Corporation, and "Lotus Organizer" is a registered trademark of Lotus Development Corporation.)

Use of electronic calendaring systems for purposes such as scheduling meetings of multiple persons is known in the art. For example, an invitation list may be created for a particular meeting, and a calendaring software application may then use this list to check each invitee's calendar for available time periods. A meeting may then be scheduled during a time period in which all (or some majority) of the invitees have sufficient time available on their calendar. However, it is desirable to more fully exploit the information stored in the calendaring system.

As an example, electronic calendar-based engines could be used to drive other software applications and agents, such as e-mail out-of-office agents which would provide automated responses to e-mail informing a sender that the recipient is currently away. Many facilities exist today with which users can configure their e-mail systems to respond with various forms of "I am away" messages, but these facilities require manual intervention by the user. Typically, the user selects a configuration action for his e-mail account and enters information (such as a text string) that he would like to have sent in an automated response upon receipt of incoming e-mail. A time period during which this automated response should be used may be entered; alternatively, the automated response may remain active until the user resets the configuration information for his account. Manual techniques such as these tend to be tedious for the user, especially if the user is frequently away and needs to repeat this configuration process often. Such techniques also tend to become out of date or out of synchronization with the user's actual status, as the user may forget to change his settings or may simply choose not to change them. It may be difficult for some users to change their status once they have left their office as well, as they may no longer have access to the necessary systems. The more tedious it is for the user to change his configuration settings, the more likely it is that he will choose to let them become out of synchronization with his status. This leads to the undesirable situation where it appears that the user is available and checking his e-mail—and may therefore be expected to reply quickly to messages—when in fact he is not.

U.S. Pat. No. 5,428,784, which is entitled "Method and Apparatus for Linking Electronic Mail and an Electronic Calendar to Provide a Dynamic Response to an Electronic Mail Message" discloses a technique for automatically responding to a received e-mail message using information stored in the addressee's electronic calendar. When an e-mail message is received, its receipt time is compared to the addressee's electronic calendar to see if any events are currently scheduled. If so, various types of information regarding the scheduled event (such as the start and stop time and what the event comprises) may be returned as a response to the e-mail sender so that the sender can determine whether the addressee is likely to be viewing his e-mail at the present time. If the user's calendar indicates that he is currently in a meeting or on vacation, for example, it is unlikely that the sender's mail will be read promptly. If the sender needs an immediate response to his email message, the sender can evaluate the automated response to decide whether to try some other source of information. However, no automated technique for determining these alternative information sources is disclosed. Furthermore, no technique is disclosed for evaluating an electronic calendar for future user availability.

Voice mail systems are also typically manually configured, with the user recording a greeting change each time he is away from the office and again when he returns. As discussed above with reference to manually configuring e-mail systems, the process of manually changing voice mail greetings is especially tedious for those users who need to make changes often, such as those who travel frequently, who attend many off-site meetings or somewhat lengthy meetings, and so forth. Most business people are familiar with the scenario of calling someone's office and receiving a recorded voice mail message indicating that the callee is away but will return on some particular date, where that date has long since passed.

In addition to the problem of not fully exploiting the information available on an electronic calendar, some existing electronic calendars may be difficult for others to visually inspect. That is, when a calendar owner has many events scheduled, it may be rather difficult for a human reader to determine exactly where that calendar owner is at a particular point in time. Furthermore, it may be quite difficult to determine how to contact the calendar owner at a point in time by visually reviewing his calendar, as the means of contact may vary widely if the owner is in different places throughout the day.

Accordingly, a need exists for a technique which enables calendar-driven personal assistant applications to better serve their users. This technique should take into account the context in which calendar events and calendar information have been created, and use this information in an automated manner to dynamically determine a calendar owner's availability (and/or other information) and dynamically generate an automated response using information which has been prepared in advance of receiving an incoming event.

SUMMARY OF THE INVENTION

An object of the present invention is to provide a technique which enables electronic calendar-driven personal assistant applications to better serve their users by analyzing the calendar events and calendar information in advance of receiving an incoming event.

Another object of the present invention is to provide a technique which enables automated, dynamic generation of responses, using information which has been prepared in advance of receiving an incoming event, to attempts to contact a calendar owner.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a system, method, and computer program product for using calendar events and information from an electronic calendar to prepare responses to incoming events. This technique comprises: creating calendar events on an electronic calendar, the calendar events being organized according to a multi-level hierarchy comprising context events at an upper level of the hierarchy and specific events at a lower level of the hierarchy, wherein zero or more specific events may be scheduled on the electronic calendar during any particular context event; analyzing the calendar events created for one or more users to determine information about the users for a particular period of time, storing the determined information; retrieving, upon occurrence of an incoming event, the stored information for a selected one of the one or more users; and using the retrieved information to automatically respond to the incoming event.

The incoming event may be one of (1) detecting arrival of an electronic mail message for the selected user while the selected user's calendar indicates that he is not currently available for checking his electronic mail (e.g. when the user is out of the office); (2) detecting arrival of an instant message for the selected user while the selected user's calendar indicates that he is not currently available for instant messaging; (3) detecting an incoming voice call for the selected user where the selected user does not answer the incoming voice call; or (4) receiving a request for instant messaging status for the selected user. In this case, the automatic response preferably comprises a notification informing a sender of the electronic mail message or the instant message, a caller making the incoming voice call, or a requester of the instant messaging status of the selected user's current status. In another aspect, the incoming event may be receiving a request for project or resource management information, in which case the retrieving operation retrieves stored information for a plurality of users to provide information about the context events and specific events scheduled for the users at a target date and a target time period. In this aspect, the request may ask whether any team member is available at a particular location during a particular time period on a particular date.

The technique may further comprise automatically applying a default context during calendar periods when no other context event is active.

Zero or more attribute values may be specified for each of the context events and each of the specific events. In this case, the analyzing operation preferably further comprises analyzing the specified attributes of a context event and of any specific events that are applicable during the particular period of time. For example, the attribute values may include one or more of: (1) information on how to immediately contact the user; (2) whether, and how often, the user checks electronic mail messages; (3) whether the user is available for instant messaging; 4) whether, and how often, the user checks voice mail messages; and (5) an alternative contact person for the user. In another aspect, the analyzing operation may further comprise determining, for each of the one or more users, when a distinct set of context event, specific event, and attribute values applies, in which case the storing operation preferably further comprises storing a distinct entry for each of the distinct sets. Overrides may be specified for the attribute values, in which case the analyzing operation preferably further comprises applying the overrides to the attribute values prior to operation of the determining process.

Default attribute values may be specified for context event types and for specific event types, and a particular context event and/or a particular specific event may include attribute values which override the default attribute values. In this case, the analyzing operation further comprises applying the overrides to the default attribute values.

The present invention will now be described with reference to the following drawings, in which like reference numbers denote the same element throughout.

BRIEF DESCRIPTION OF THE DRAWINGS

FIGS. 6 through 11 depict sample graphical user interface (GUI) display panels and messages which may be provided by an implementation of the present invention;

FIG. 14 depicts a table that may be used to store calendar information for this alternative embodiment.

DESCRIPTION OF THE PREFERRED EMBODIMENTS

Figure 1:
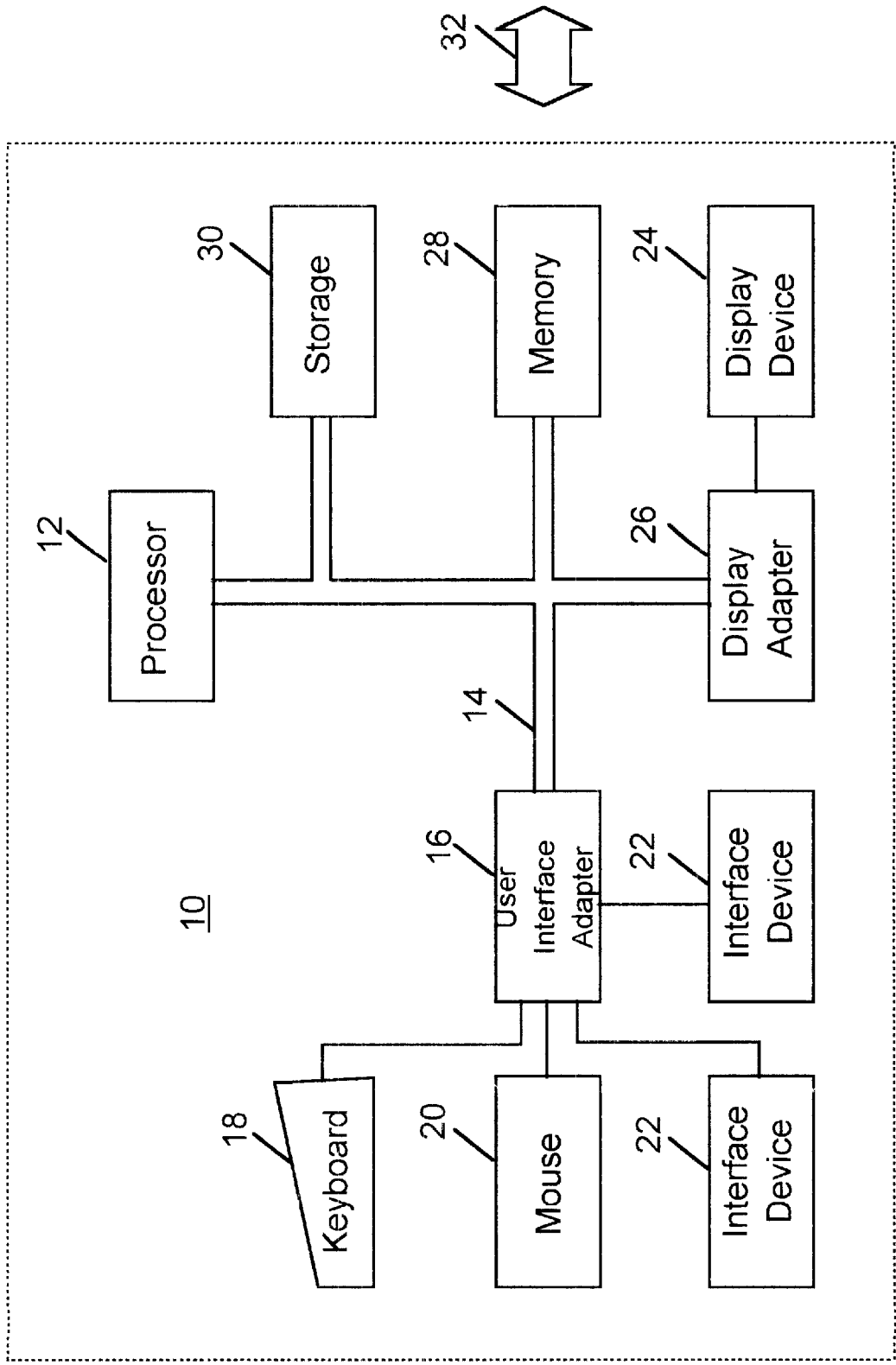
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
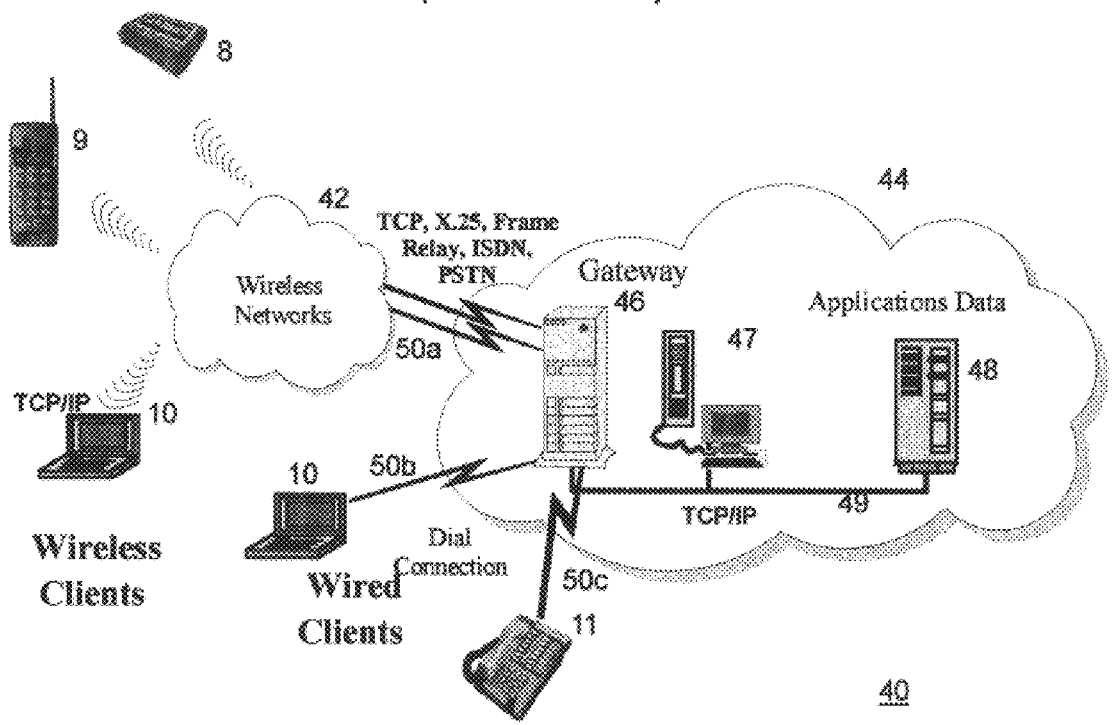
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10 and other devices such as pagers 8 and cellular phones 9. Additionally, as those skilled in the art Will appreciate, one or more LANs may be included (not shown), where a LAN may comprise a plurality of intelligent workstations and other devices coupled to a host processor. Furthermore, devices such as conventional telephones 11 may access the features of the present invention by connecting to a computing network through one or more telephone switches (not shown).

Still referring to FIG. 2, the networks 42 and 44 may also include mainframe computers or servers, such as a gateway computer 46 or application server 47 (which may access a data repository 48). A gateway computer 46 serves as a point of entry into each network 44: The gateway 46 may be preferably coupled to another network 42 by means of a communications link 50a. The gateway 46 may also be directly coupled to one or more workstations 10 using a communications link 50b, or to other devices such as those shown at element 11 through a link 50c. The gateway computer 46 may be implemented utilizing an Enterprise Systems Architecture/370 available from the International Business Machines Corporation ("IBM"), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10 and other devices such as those shown at elements 8 and 9.

Those skilled in the art will appreciate that the gateway computer 46 may be located a great geographic distance from the network 42, and similarly, the workstations 10 and other devices 8, 9, 11 may be located a substantial distance from the networks 42 and 44. For example, the network 42 may be located in California, while the gateway 46 may be located in Texas, and one or more of the workstations 10 may be located in New York. The workstations 10 and other devices such as those shown at elements 8 and 9 may connect to the wireless network 42 using a networking protocol such as the Transmission Control Protocol/Internet Protocol ("TCP/IP"), AppleTalk®, a particular wireless networking protocol (such as the Wireless Application Protocol, or "VAP", the Global System for Mobile communications, or "GSM", etc.), or the Systems Network Architecture ("SNA") over a number of alternative connection media, such as cellular phone, radio frequency networks, satellite networks, etc. ("AppleTalk" is a registered trademark of Apple Computer, Inc.) The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10, other device such as those shown at 8 and 9, and/or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. Furthermore, networked storage (including storage area networks and network-attached storage) may also be used. The techniques and methods for embodying software programming code in memory, on physical media, and/or distributing software code via networks are well known and will not be further discussed herein.

A user of the present invention may connect his computing device to a server using a wired connection, or a wireless connection. Wired connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computing device may be any type of computer processor, including laptop, handheld or mobile computers; vehicle-mounted devices; desktop computers; mainframe computers; etc., having processing and communication capabilities. The features of the present invention may also be accessed by users who are not using computing devices, but instead are using devices such as conventional telephone 11 (as will be described). The remote server, similarly, can be one of any number of different types of computer which have processing and communication capabilities. These techniques are well known in the art, and the hardware devices and software which enable their use are readily available.

In the preferred embodiments, the present invention is implemented as one or more modules (also referred to as code subroutines, or "objects" in object-oriented programming) of a computer software program (or programs). The program code of the preferred embodiments may be implemented as objects in an object-oriented programming language, or in a conventional procedurallyoriented language, or in a mix of object-oriented and procedural language code. The code for addition of calendar entries (as well as for setting preferences and so forth) preferably operates on a workstation or other user device, or may operate on a server if the workstation is simply presenting a user interface. Other portions of the code (which analyze calendar entries, generate automated responses, etc., as will be described herein) preferably operate on one or more servers.

With sufficiently detailed calendar entries, the prior art problems previously described (difficulty of visually inspecting electronic calendar entries to determine a person's current status, the tedious and error-prone nature of e-mail and voice mail systems which require manual revision each time a user's status changes, etc.) can be overcome through use of software applications which evaluate a user's calendar; determine the calendar owner's status at a point in time (such as out of the office, in the office and available, in the office but attending a meeting, etc.); automatically provide dynamically-generated information based on this status (for example, upon receiving incoming e-mail, instant messages, or voice mail for the calendar owner, or receiving a request for information such as that used in project management or resource management scenarios), including information about how to most immediately contact the owner of the calendar; and dynamically triggering changes to the calendar owner's status, all without manual intervention. These functions may be referred to collectively as "personal assistant applications". No existing prior art techniques are known to the inventors which overcome these problems and provide these functions efficiently and effectively, without manual intervention.

Personal assistant applications need to recognize that users' capabilities, needs, and behaviors change depending on where they are, what devices they have access to, and what their main purpose is in being there. For example, if a user is away from the office on a trip, whether or not that user can be contacted by e-mail (or telephone, pager, cellular phone, instant messaging, etc.) may depend on a number of factors including whether the trip is for vacation or business purposes. No existing prior art personal assistant applications nor calendaring applications are known to the inventors which consider such factors in an automated manner and determine how (or if) it is possible to interact with a particular user at a point in time. Personal assistant applications also need to be able to deal with time periods in which multiple concurrent events are listed on a user's electronic calendar, such as determining what action to take for a user whose calendar indicates that he is (1) away from the office on business but is (2) scheduled to participate in a meeting or teleconference. (For example, it may be that the user intends to participating in a meeting from his remote location if that meeting does not require his in-person attendance.)

The present invention provides an improved technique for defining calendar events and for using those events to customize information pertaining to the calendar owner. The present invention provides for automatically and dynamically deducing a calendar owner's status and associated information from his electronic calendar, and using that deduced status and associated information to dynamically generate an automated response to an attempt to contact the calendar owner. This information may be determined when an event occurs (such as an incoming phone. call, e-mail message, or instant message), or alternatively it may be determined a priori and stored for use upon occurrence of such an event. In some cases (such as for an incoming phone call), the automated response may provide for forwarding the incoming event to a designated alternate contact. (Note that while the preferred embodiments are described herein primarily in terms of responding to attempts to contact the calendar owner, this is for purposes of illustration and not of limitation. The present invention may also be used advantageously for other purposes and in other scenarios.)

The present invention introduces the concept of a hierarchy of events into electronic calendaring systems. In the preferred embodiments, a 2-level hierarchy is defined. This 2-level hierarchy enables personal assistant applications to automatically account for a user's capabilities, needs, and behavior changes based on (inter alia) where the user happens to be at a point in time, what devices the user has access to, and when the user is away from the office, his current activity or the purpose for his being away.

The top level of the hierarchy is referred to herein as the "context level", and events entered at this level are referred to as "context events". The lower level is referred to as the "specific level", and events at this level are referred to as "specific events". Events which are created as context events are, by convention, typically longer in nature than specific events. Examples of context events include:

in the office
working at home
working at alternate location
outside normal working hours
vacation
holiday
attending class
domestic business trip
foreign business trip
illness A default context may be used which is not required to be explicitly entered as a calendar event. For example, "in the office" may be used as a default context. If a user's normal work schedule is known to the calendaring system, the context event "outside normal working hours" may be deduced and therefore does not need to be explicitly calendared. Thus, the entries on a user's calendar will typically represent exceptions to some currently-applicable default context.

Optionally, context events may be logically grouped into categories. In the preferred embodiments, for example, context events such as "in the office", "working at home", "working at alternate location", and "business trip" (which are all categories of "working") comprise one logical group, while other context events such as "outside normal working hours", "vacation", "holiday", etc. (which are all categories of "not working") comprise a separate category. The significance of this type of grouping will be discussed in more detail below. As an alternative to using logical grouping, an additional upper layer in the hierarchy may be defined to explicitly provide this type of grouping.

Information relating to the user's capabilities, needs, and behaviors can differ depending on the user's current context. According to the present invention, this information is stored as attributes (referred to equivalently herein as preferences or characteristics) of a particular context event. Examples of attributes include:

whether the user carries a pager (or perhaps a Short Message Services, or "SMS", device) in this context, and what hours it will be turned on whether the user carries a cellular phone in this context, and what hours it will be turned on whether the user has access to a network-connected computer in this context whether the user will check e-mail in this context, and at what intervals whether the user will check voice mail in this context, and at what intervals whether the user will be available for instant messaging, and at what times whether the user will have access to a fax machine in this context, and what the number is additional data such as how to contact the user (for example, by contacting a secretary at an alternate work location or by using an alternative phone number)

how to handle free time (for example, electronic meetings and teleconferences may be scheduled when working at home, but in-person meetings may not)

Values of these different types of attributes may be specified as system-wide defaults; as user-specific preferences that the user enters into his calendar-driven personal assistant application; by explicit data that is entered (for example, using keywords) on the calendar entry itself for a particular context event; and/or using other techniques for specifying attribute values that are well known to one of skill in the art.

Note that in some cases, when an attribute indicates that a user is reachable using a particular type of device, it may be possible to dynamically determine whether that device is currently active and available (for example, by working with the carrier). Techniques for making this dynamic determination are outside the scope of the present invention.

Specific events occur within a context defined by an explicit or inferred context event, and may be considered as overriding or refining that context event. Specific events are therefore typically shorter in duration than context events. For example, if the user's context between 8 a.m. and 5 p.m. on a particular day is "in the office", a meeting may be scheduled on the user's electronic calendar as a specific event from 9 a.m. to 10 a.m. within that context. Examples of specific events include:

in-person meetings electronic meetings teleconferences attending training, presentations, or seminars lunch personal business travel customer visit "do not disturb" periods Specific events may also have associated attributes. The types of information entered as specific event attributes may have semantics similar to, or different from, context event attributes. For example, if a user's context is "vacation", an attribute for this context may be that the user is not checking voice mail or e-mail. The user may be participating in an electronic meeting (or perhaps a teleconference) during his vacation, however, which can be scheduled as a specific event using the present invention. The attributes for the specific event may then specify that the user will be checking his e-mail during the time period of the electronic meeting, or perhaps will check his voice mail before or after the teleconference, etc.

Attributes may be defined which pertain only to context events, only to specific events, or to either context events or specific events. When an attribute is defined as pertaining to both specific events and to context events, the values which are applicable at a point in time are coalesced to provide a result. In the examples which have been described above (of checking e-mail and checking voice mail, where the context event is "on vacation" and the specific event is "attending an electronic meeting" or "participating in a teleconference"), checking e-mail and checking voice mail are preferably defined as the latter type of attribute, enabling the attribute value for a particular specific event to automatically override the value of that attribute for the context event which is applicable at a point in time. In the preferred embodiments, default values may be specified for context and specific event attributes, and these default values may optionally be explicitly overridden for a particular instance of that context or specific event (e.g. when the calendar owner schedules an event on his calendar). Use of attributes, including default and overridden values, will be described in more detail below. (Attribute values for specific events may be specified in a similar manner to that described above for context event attribute values)

By recognizing and reacting to this hierarchy of events, calendar-driven personal assistant applications can better serve their users by providing and using information associated with the context and specific events. For example, the manner in which a calendar owner can be most immediately contacted may be defined as an attribute of context and specific events. In this case, information on how to contact a calendar owner can be provided as an attribute value for a particular context event, and different contact information may be provided as an attribute value for a specific event occurring within the time period of the context event. By understanding the hierarchy of event types, the application can automatically adapt to switch to using the specific event contact information for the duration of that event and then switch back to using the context event contact information. Attributes defined as pertaining only to a specific event are used in addition to, and not to override, any attributes defined as pertaining to context events. Similarly, attributes defined as pertaining only to a context event do not need to be coalesced with attribute values of specific events. As an example of this situation, suppose an employee is traveling on business for an extended period of time. A context-only event attribute may be set to indicate where the employee's hard-copy mail should be delivered while this context event is active. It is unlikely that such an attribute will be meaningful for the relatively short duration of specific events, and thus the hard-copy mail attribute may be one element of the employee's status that has no corresponding specific event attribute.

It may also be useful to evaluate the calendar events from the multiple levels of the hierarchy in isolation, rather than as a coalesced result. Suppose, for example, that an employee wishes to know when her manager is out of the office during a particular week. The employee may be uninterested in why the manager is out, or what the manager is doing while away. In this example, it is preferable to provide the employee only with information from the context level of the hierarchy and omit information from the specific level. As another example, it may be desirable to generate reports providing information about how much time a company's employees spend on personal business, attending in-person meetings, or in other activities which may be identified as specific events. In this case, the context level information is not relevant to the report generation. Furthermore, there may be situations where it is useful to evaluate context and/or specific events based upon values of their associated attributes. As an example, context and specific events and their attributes may be evaluated to determine when a group of calendar owners have their pagers or cellular phones active; this information may then be useful in determining system costs and/or processing demands. There may also be security or privacy reasons for providing less detailed information. (Security or privacy concerns may also be used as a factor in the amount of detail provided to others regarding particular context and/or specific events on a user's calendar.)

FIGS. 6 through 11, described below, will be used to demonstrate how information from the events in the 2-level hierarchy is used to automatically generate responses when an attempt is made to contact a calendar owner. Use of this 2-level hierarchy may also be extended to other scenarios besides resolving contact information, however, and thus the descriptions herein are for purposes of illustration and not of limitation.

As one example of an alternative scenario for using the present invention, project management and scheduling applications may make beneficial use of the hierarchical calendar entries to more efficiently and effectively manage resource utilization. Electronic calendars of the employees working on a project may be evaluated by a scheduling application to determine, for example, which team members have time available. This time can be accumulated to determine when a particular task might be expected to finish, given the existing human resources, the requirements of that task, etc. By using the multi-level event hierarchy of the present invention, blocks of time when a team member's calendar indicates he is in the office but is unavailable to work on the task (for example, when he is in a meeting) can be automatically computed. Or, a project manager who wishes to consult with a team member who is currently out of the office could programmatically determine whether (and using what means) that person is available for consultation. Also, knowing whether a team member who is traveling is nearby or is hundreds of miles away would allow the project manager to decide if that individual is available to assist in a local project emergency. Critical project situations in remote locations might be efficiently managed by using the present invention to determine which team members are currently traveling near the remote location, and which of those individuals has time available to address the critical situation. On large projects, automated techniques such as those which are available using the present invention are desirable to efficiently and reliably provide these types of information.

In addition to providing automated responses to incoming e-mail messages and voice mail calls, the present invention may also be used advantageously to generate responses for use in instant messaging systems. Instant messaging systems such as AOL Instant Messenger[SM] and Lotus Sametime™ Connect allow a user to change his status at a point in time. For example, Sametime™ has 3 states: "I am active", "I am away", and "Do not disturb me". A user is also allowed to specify a status message to be displayed when he is in any of the 3 states. The techniques of the present invention may be used to automate the generation and content of these status messages. For example, suppose a user (1) schedules a specific event of "lunch" on his electronic calendar, where the lunch event is scheduled to end at 1 p.m., and (2) also sets an attribute of the lunch event to indicate that his preferred mode of contact during this event is by his pager, where the pager uses a certain specified telephone number. (This attribute may be a default attribute for all lunch events, or an override value for this particular lunch event, as has been discussed.) At the start of the lunch event period, anyone sending an instant message to the user will be automatically informed that the user's status is "I am away", without the user having to manually change his instant messaging status. An accompanying status message during this lunch event might then use the text "Gone to lunch. Be back at 1:00. Page me at 888-555-4444 if this is urgent.". (Optionally, an implementation of the present invention may automatically forward incoming messages when appropriate, such as forwarding an incoming message to a user's alphanumeric pager in this example.) At the scheduled end of the lunch period, the user's instant messaging status will then automatically revert to the prior status (or to another status which may become applicable at that time). Furthermore, if a user's instant messaging status is set to "I am away", either by the user or through the techniques of the present invention, mouse or keyboard activity occurring at the user's device may optionally cause the status to change to "I am active". (This mouse and keyboard-driven status change is provided by prior art instant messaging systems.)

Figure 3:
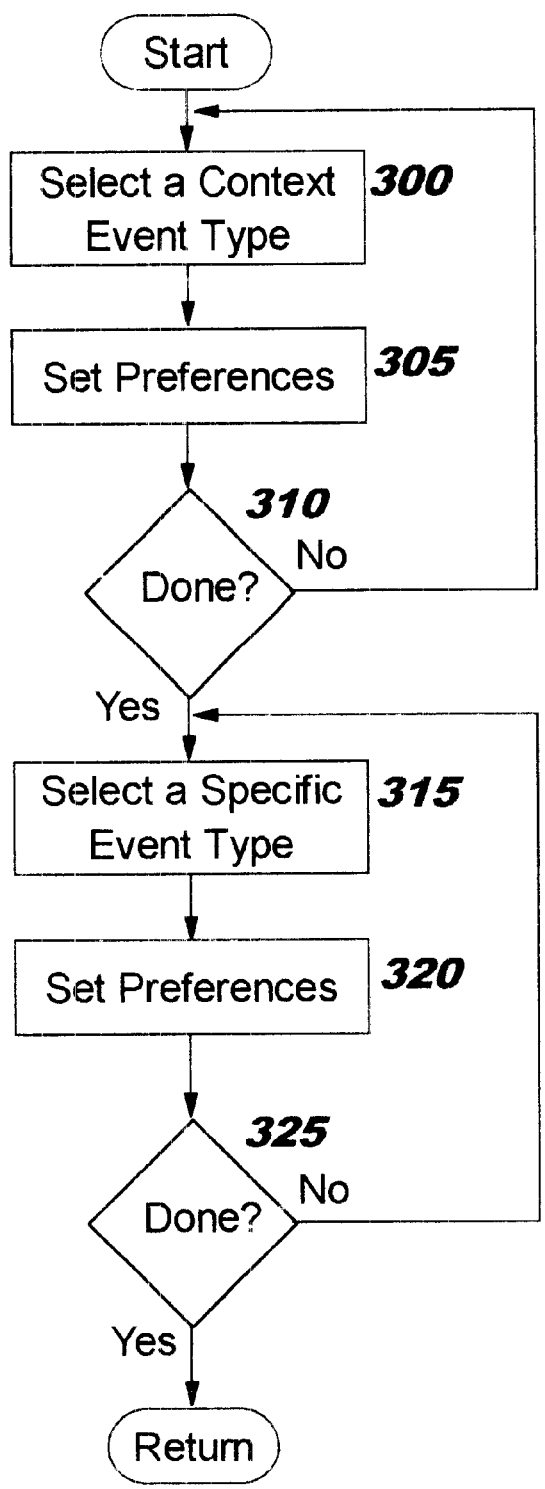
FIGS. 3, 4, 5A and 5B illustrate flow charts which set forth the logic which may be used to implement the preferred embodiment of the present invention.
Figure 4:
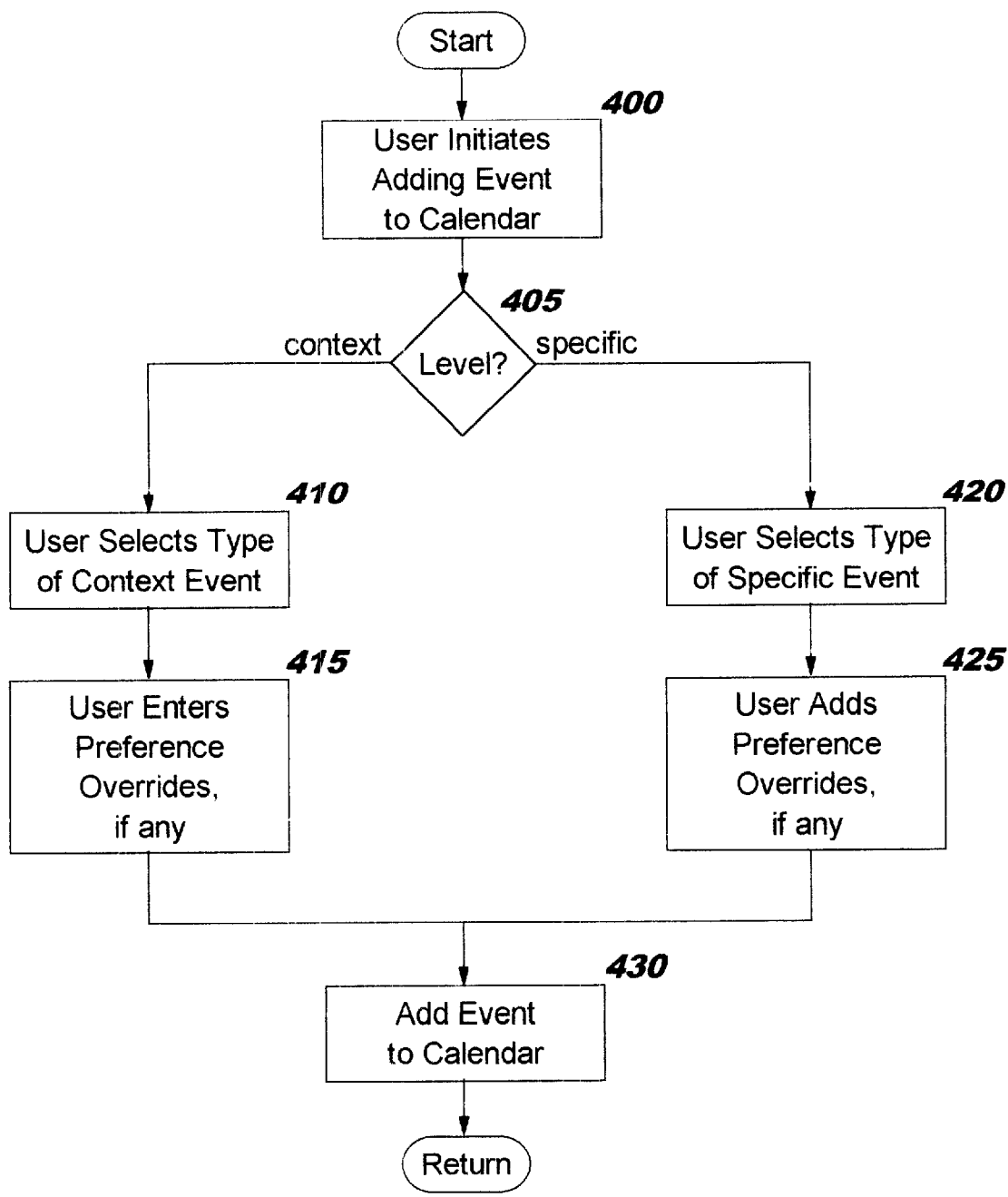

The logic which may be used to implement the preferred embodiments of the present invention will now be described with reference to the flowcharts in FIGS. 3 and 4 FIG. 3 illustrates setting user-specific preferences or attributes for particular event types. FIG. 4 illustrates the logic which may be used to add events to a user's calendar. A first preferred embodiment of evaluating calendared events and their associated attributes for information retrieval will then be described with reference to the logic in FIG. 5, and following this description, the alternative preferred embodiment will be described with reference to the logic in FIGS. 12 and 13.

Default attribute values (preferences) for event types may be set using the logic of FIG. 3. In the preferred embodiments, the user may first select a context event type of interest (Block 300). The preferences for this context event are then set (Block 305), preferably by selecting from predefined choices which are presented on a GUI display screen. Block 310 checks to see whether there are more context events to process. If so, control returns to Block 300; otherwise, processing continues at Block 315. In an optional enhancement of the preferred embodiments, the settings to use for one or more of a user's preferences may be learned by programmatically evaluating past actions and/or behaviors, using techniques which are known in the art.

Figure 6:
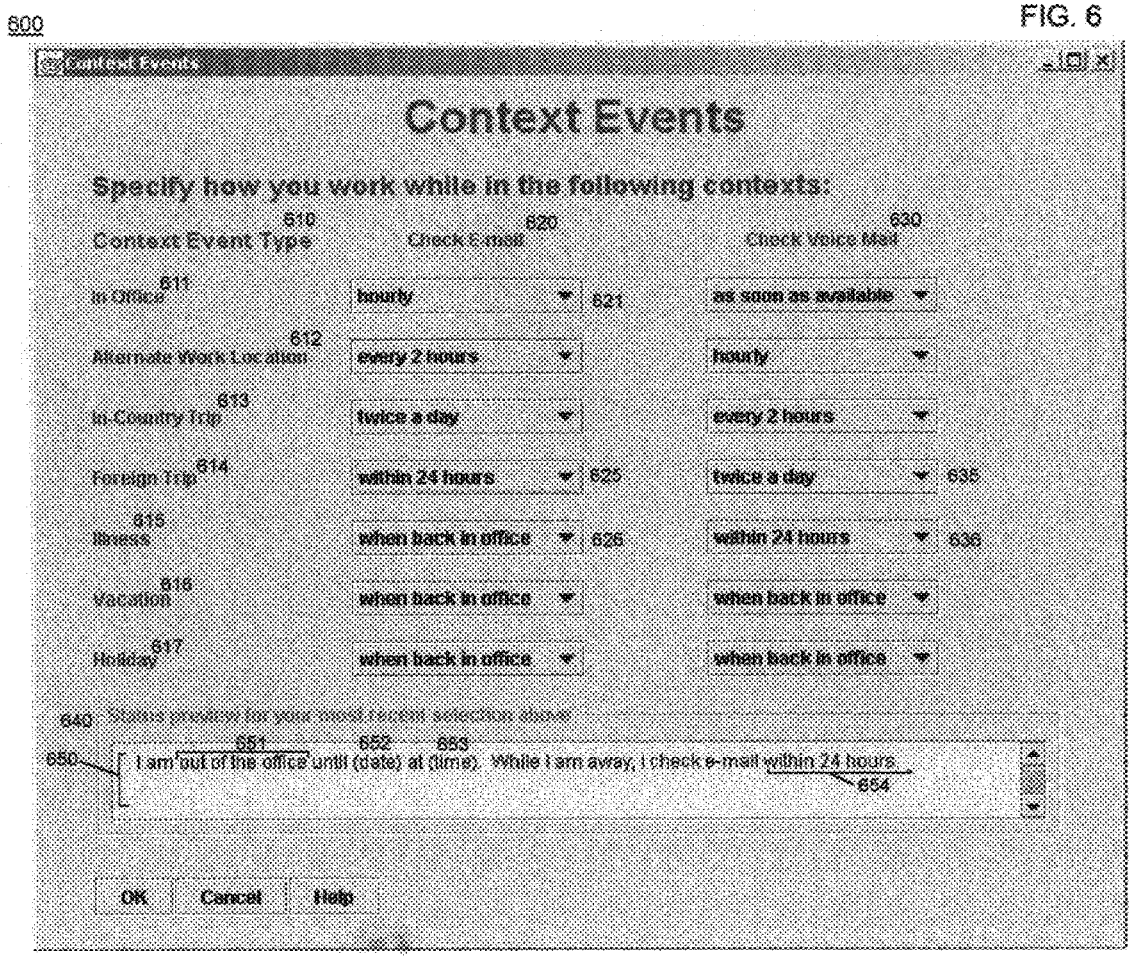

FIG. 6 illustrates a sample GUI display panel 600 that may be used to enter context event preferences for a user. This display panel shows the attributes of checking e-mail 620 and checking voice mail 630, for a number of different context event types 610. Example context event types are shown at 611 through 617, such as "In Office" 611 and "Alternate Work Location" 612. For a context event of "foreign trip" 614, the user has indicated that he checks his e-mail within 24 hours (see 625) and checks his voice mail twice per day (see 635). For a context event of "Illness" 615, this user has indicated at attribute values 626 and 636 that he does not check e-mail or voice mail (but instead will check them when he returns to the office or within 24 hours, respectively). Note that these default attributes may be overridden for a particular trip or illness, if desired, when calendaring that time, according to the logic of FIG. 4. Similarly, the attribute values set for other context events may be overridden if desired by a particular calendar owner.

While the attributes of checking e-mail 620 and checking voice mail 630 are illustrated on GUI display panel 600, other attributes may be similarly presented. For example, a user who participates in instant messaging may set his preferences regarding when he uses his instant messaging system.

An implementation of the present invention may provide a status display 640 which shows the user information about the preferences he has entered. A template message 650 is shown in this example, where this message may be used in a dynamically-generated response to incoming email in a particular user context. In the example of FIG. 6, the user has just selected his preference for e-mail while on a foreign trip, as shown by the highlighting of GUI object 625. Thus, status display 640 allows the user to preview the message 650 that will be returned to e-mail senders when this context is indicated for the user's calendar. As shown in this template message, the returned e-mail will state that the user is out of the office (shown at 651). The ending time of the event will be substituted into message 650 for the placeholder "(time)" 653, and the return date will be substituted for the placeholder "(date)" 652. The present invention also reflects the user's e-mail checking attribute value 625 for the "foreign trip" context event 614 in this message 650, as shown at 654, unless this default attribute value 625 is overridden for a particular foreign trip context event which triggers generation of the unavailability message. According to the preferred embodiments, detailed information such as the type of context event causing the user to be unavailable is not provided. Instead, for e-mail the message simply states that the user is out or unavailable. In the preferred embodiments, the status message for voice mail informs the caller when the callee is in the context "in the office", "outside scheduled working hours", and "at alternate work location". Alternatively, the user may be given the option as to what level of detail he would like provided in a status message of this type.

Returning now to FIG. 3, at Block 315 the user may select a specific event type of interest. This event type's preferences are then set (Block 320), in an analogous manner to that used in Block 305. Block 325 checks to see if there are more specific events to be processed. If this test has a positive result, control returns to Block 315, otherwise, the processing of FIG. 3 ends.

Figure 7:
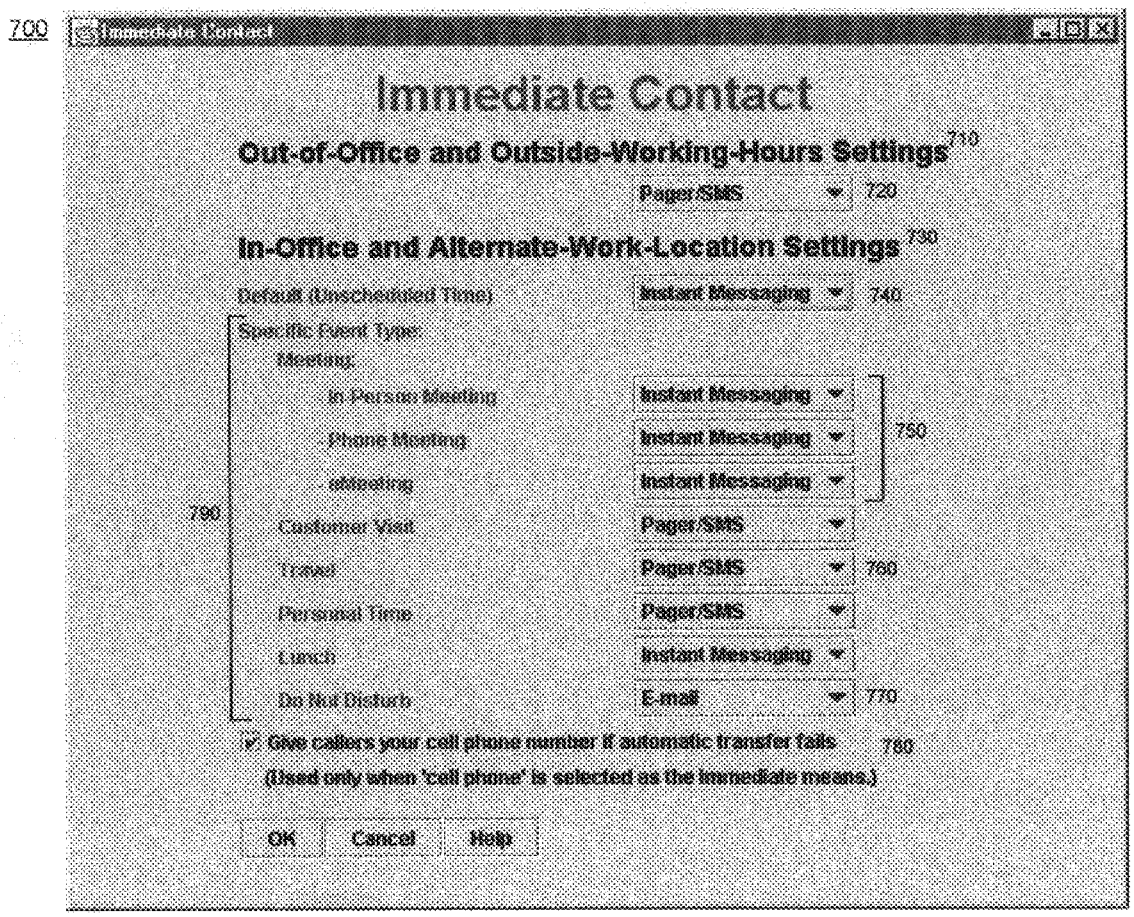

FIG. 7 illustrates a GUI display panel 700 that may be used to enter information for an "immediate contact" attribute. As previously stated, attribute values may be associated with context events, with specific events, or with both context and specific events. FIG. 7 provides an example of the latter situation. Here, the out of office and outside working hours context events (shown at 710) have an immediate contact attribute value 720, and a different default value for this attribute can be defined for unscheduled time during the in office and at an alternate work location context events (as shown at 730 and 740). However, the specific events shown at 790 may have values for this immediate contact attribute that will override the values for the context events. This immediate contact information may then be used to provide information to (for example) an e-mail sender or a voice mail caller when the personal assistant application determines that the addressee or callee is not available. As shown by the example values entered on this panel, this user can be most immediately contacted by pager 720 when the user's current context is "out of the office" or when it is outside normal working hours 710. (Alternatively, separate entry fields can be provided if it is desired to allow different attribute values for these two context event types.) When this user's current context event is "in the office" or "at alternate work location" 730, his default means of immediate contact is through an instant messaging system, as shown at 740. This user also prefers to be contacted by instant messaging when a specific event on his electronic calendar indicates that he is in various types of meetings, as shown at 750. However, this example also illustrates that this user prefers to be contacted by pager when his specific event is that he is traveling 760 or by e-mail 770 when the user's specific event indicates he should not be disturbed. The user may indicate, as shown at 780, that he wishes his cellular phone number to be given out to someone who is attempting to contact him immediately, but the automatic transfer fails. In the preferred embodiments, this option is available only if cellular phone access has been selected as the means of immediate contact (e.g. from the associated drop-down list) for the context event or specific event which is active at that time. While several examples have been depicted, the drop-down lists shown in FIG. 7 preferably contain selections for a wide variety of communication techniques.

The process of adding an event to a user's calendar begins at Block 400 of FIG. 4, where the user initiates the addition. This may comprise opening a calendaring application and/or selecting an add operation (for example, through use of a menu selection, icon, or pushbutton command) in an already-opened application. The test at Block 405 indicates that a divergent path is taken, depending on whether the event to be added is a context event or a specific event. For context events, control transfers to Block 410 where the user selects a particular type of context event. Preferably, a list is presented to the user, and a selection is made from this list. The user may then specify any applicable preferences to be associated with this context event (Block 415), where those preferences will override the default attributes of this event type (which may have been previously specified using the process of FIG. 3, described above).

Figure 8:
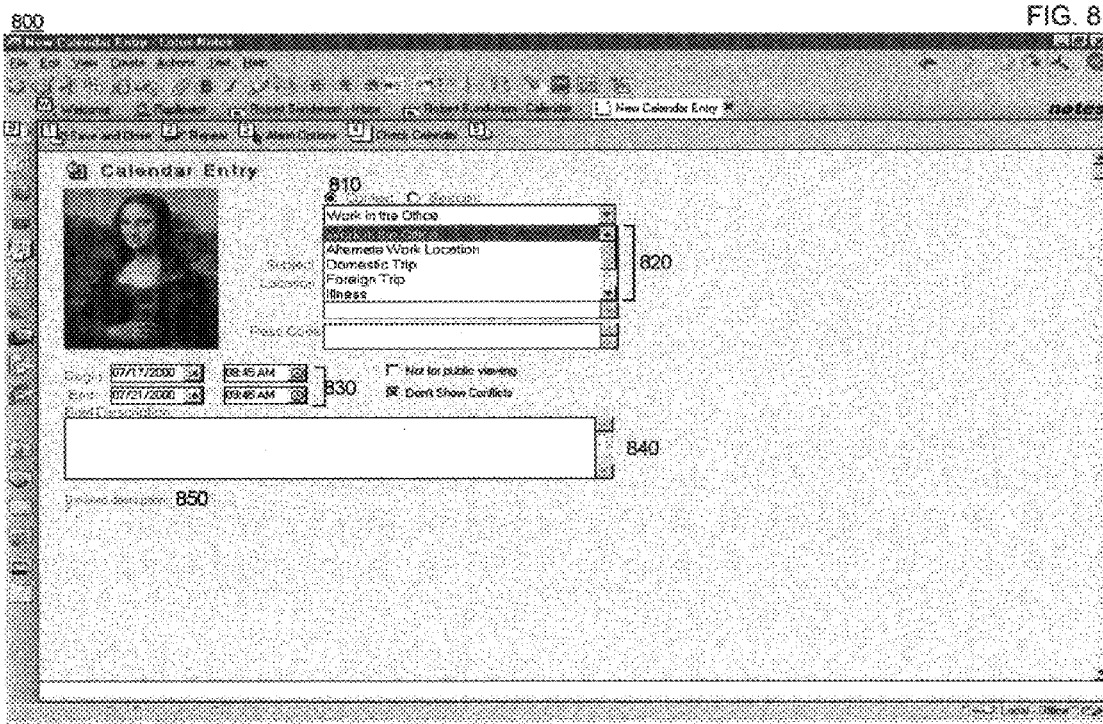

FIGS. 8 and 9 illustrate sample GUI display panels 800, 900 which may be used to enter context and specific events, respectively, in an implementation of the present invention which is referred to as the "Mona" system. FIG. 8 shows a scrollable list 820 containing predefined context events, where this list is displayed upon selecting 810 to enter a context event. Fields for entering the beginning and ending date and time of the context event are shown at 830. As previously stated, context events tend to be relatively lengthy in duration, and thus fields 830 of sample display panel 800 allow entry of a context event which spans multiple days. FIG. 9 shows a scrollable list 920 which may be displayed in response to selecting 910 to enter a specific event. The date and time for the specific event may be entered at 930. (Various other types of entry fields may be provided on these display panels as in the prior art, such as the brief description 840 and detailed description 850 fields with which a user may make notes on his electronic calendar. Pass code field 940, for example, enables a user to record information that he will need to dial in to a teleconference.)

Returning now to FIG. 4, if the user is adding a specific event, that event type is selected at Block 420. As with context events, this selection process preferably comprises displaying a list of defined specific event types (such as list 920), and allowing the user to select from this list. The user may then specify preferences for this specific event (Block 425), if desired, to override the default attributes which have been previously specified.

Preference overrides for context events and specific events may be set using a selection menu, or using pop-up or pull-down menus, etc.

Upon reaching Block 430, the event and its associated preference overrides are added to the user's calendar. Preferably, a flag or other data structure variable is associated with the stored data for each calendar entry to indicate whether the entry is a context event or specific event. The processing of FIG. 4 for this event addition then ends.

In an optional aspect of the present invention, the user may be allowed to set priorities on the events he places on his electronic calendar. These priorities may then be used, for example, to resolve apparent scheduling conflicts, in a similar manner to how humans actually prioritize their time when overscheduled. For example, if a user has a meeting scheduled from 9 a.m. to noon and a teleconference scheduled on the same day from 10 a.m. until 10:30 a.m., the user may set a higher priority indicator on the calendar entry for the teleconference to show that he intends to briefly leave the meeting. When priority indicators are used in this manner, an implementation of the present invention may be adapted to consider the calendar owner as having the characteristics of the higher-priority simultaneous event for that event's duration. It will be obvious to one of ordinary skill in the art how this processing may be added to the logic of FIG. 4 (and of FIG. 5, which will now be described).

First Preferred Embodiment

According to the first preferred embodiment of the present invention, evaluation of calendar entries is performed on-demand, when an event occurs (such as an event indicating that it is desirable to contact a calendar owner, or an event requiring evaluation of calendar entries for project management purposes, etc.). In an alternative preferred embodiment, the evaluation is performed in advance by a calendar monitoring function. When the evaluation has been performed in advance, occurrence of an event then triggers use of the previously determined information. The logic used for this alternative embodiment is discussed below, with reference to FIGS. 12 and 13.

Figure 5A:
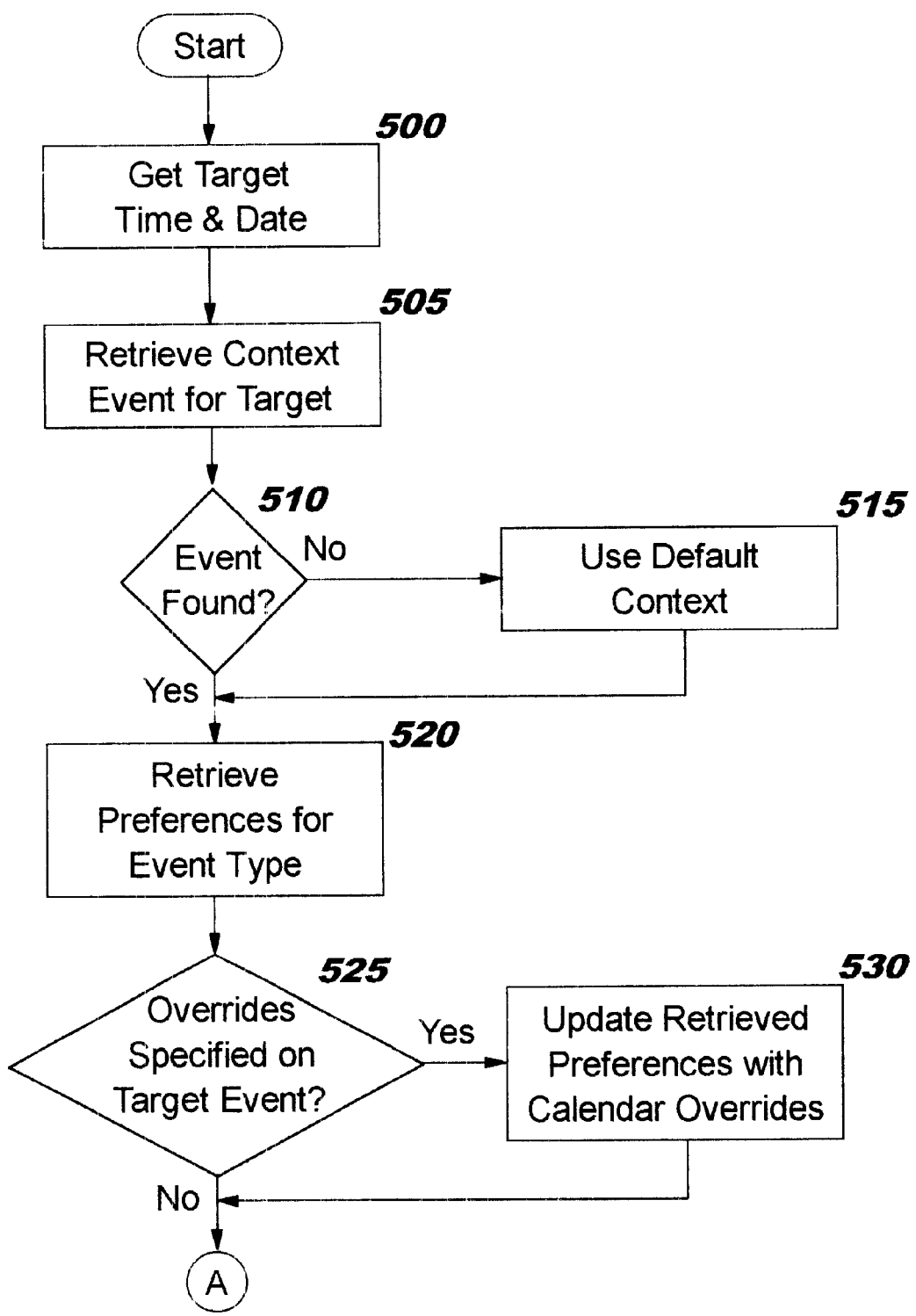
Figure 5B:
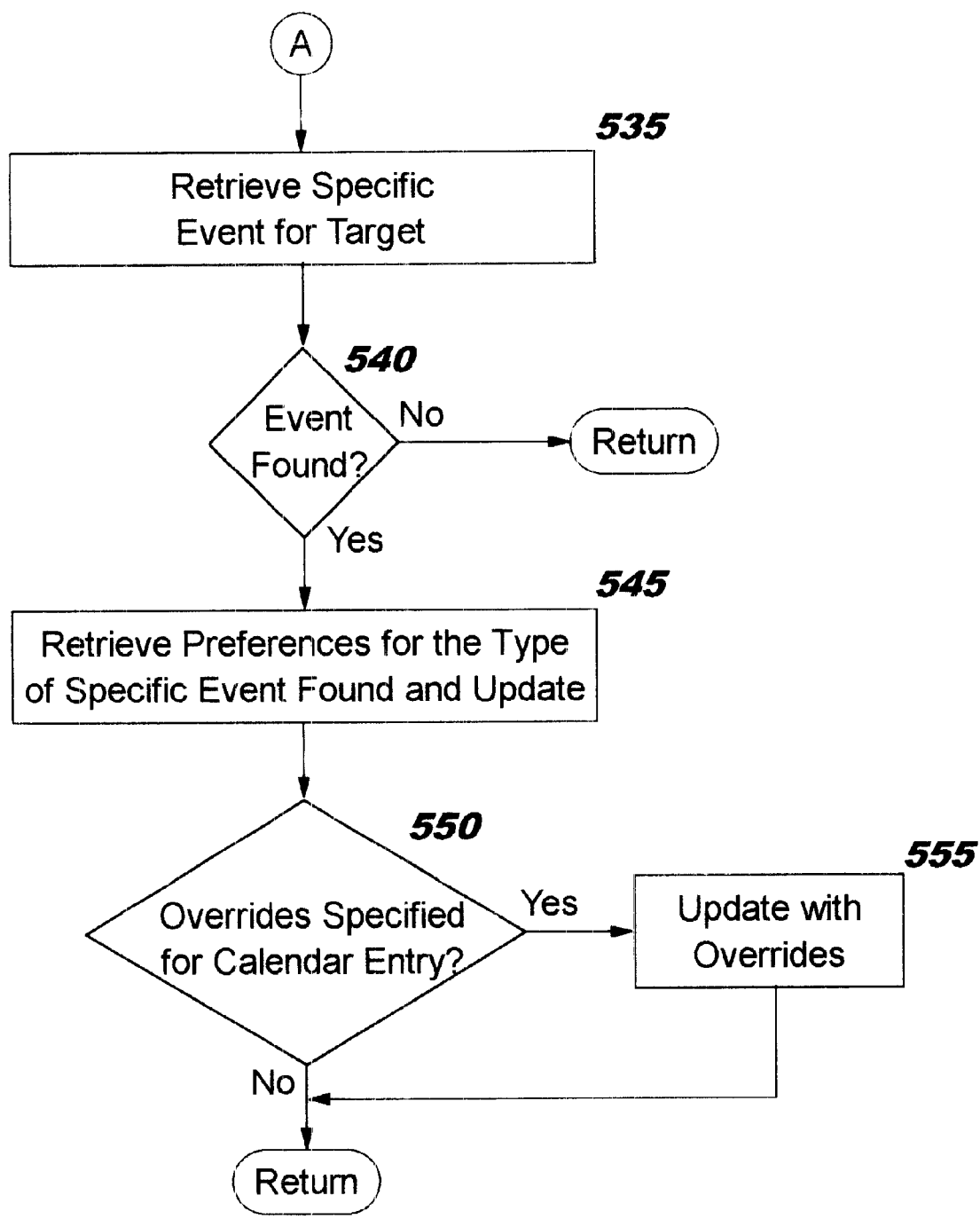

The logic of FIGS. 5A and 5B is invoked when a particular user's hierarchically-calendared events are to be evaluated. Examples of events that may invoke this processing include detecting an incoming instant message or e-mail message for a user's account (in which case it is desirable to determine whether to send an automated response to that message), detecting a request for an instant messaging user's status (where this type of status can be requested in prior art instant messaging systems prior to sending an instant message to the user), and detecting an incoming voice call which the user does not answer. Or, as an example using the project management scenario discussed earlier, this logic may be invoked when the project manager requests a project management application to determine whether a particular team member is available for consultation and if so, how that person can be reached.

At Block 500 of FIG. 5A, the target time and date are obtained. This may be the current time and date (for example, in the case of an incoming e-mail message, incoming instant message or instant message status request, or incoming voice call), or it may be a time and/or date in the future (for example, when using the present invention to determine what employee or team member is available to visit a customer site at some particular time and date) or in the past (for example, when analyzing calendars for a group of employees). The context event defined for this target time and date is retrieved from the top level hierarchy of the user's electronic calendar (Block 505). If no context entry is defined on the calendar for the target period, the test in Block 510 has a negative result and the default context event is used (Block 515). The preferences which have previously been defined for the (retrieved or default) context event are then retrieved (Block 520). Block 525 checks whether any overrides were specified for the attributes of this context event (for example, in Block 415 of FIG. 4). If so, then those overrides are used (Block 530) to update the corresponding preferences retrieved in Block 520. Processing then continues to FIG. 5B.

In Block 535 of FIG. 5B, the lower level hierarchy of the user's electronic calendar is consulted to retrieve a specific event which is defined for the target period. If no such event is found, the test in Block 540 has a negative result and the processing of FIG. 5 ends by returning the information that has been gathered thus far for the context event. Otherwise, Block 545 retrieves any preferences which have been previously defined for this specific event. If the preference apply to context events as well, Block 545 coalesces the specific event attribute settings with the corresponding context-level preferences resulting from Block 520 (or from Block 530 when overrides were found). Block 550 then determines if any overrides were specified for the attributes of this specific event (for example, in Block 425 of FIG. 4). If so, then those overrides are used (Block 555) to update the corresponding preferences resulting from the processing of Block 545. The processing of FIG. 5 then ends by returning the information which has been gathered for the context event and the specific event which are applicable to the target period.

Note that the logic in FIG. 5 evaluates both context and specific events. There may be cases, as previously described, where it is desirable to evaluate only one level of the hierarchy. For example, when a user's calendar indicates that he is in a context within the "Out" category (such as Illness, Holiday, etc.), an implementation of the present invention may be written to omit evaluating any specific events that are scheduled. Or, this type of treatment may be applied to individually-selected context events, rather than using a categorical approach. It is obvious how the logic of FIG. 5 can be adapted for such cases.

FIGS. 10 and 11 illustrate sample e-mail responses 1000 and voice mail greetings 1100, respectively, that may be automatically and dynamically generated according to the present invention. In these examples, the automated response is generated upon receiving a request to contact a calendar owner (that is, detecting an incoming e-mail message and an incoming voice mail message). Thus, the target date and time used (see Block 500 of FIG. 5) reflect the current time. Responses reflecting future target dates and times may be similarly structured. Information similar to that illustrated in FIG. 10 may also be provided as an automated response to an incoming instant message.

Preferably, the subject line 1010 of the generated e-mail response indicates that the addressee is not currently available (see element 1020) so that the sender of the e-mail message which triggers this response will be quickly alerted to that fact. The addressee's applicable context event and specific event (if any) for the target period have been interrogated to programmatically determine when this addressee will return to the office, as shown at 1050. In this example, the context is out of the office, as shown at 1040. The addressee's attribute information for the applicable context event and specific event (if any) have also been interrogated to enable informing the e-mail sender as to when this addressee is likely to view the sender's message, as shown at 1060. The subject line 1010 may also notify the e-mail sender that the addressee is checking e-mail, as shown at 1030. An optional personal message 1070 may be provided as an attribute which may be overridden, if desired, using (for example) a text string which has been entered in field 840 or 850 of FIG. 8. One or more alternate means of contact 1080 or identification of an alternate contact person 1090 may also be provided, using information which this user has previously entered as preferences (for example, by entering default preference values using a GUI display such as that shown in FIGS. 6 and 7, and/or as preference override values according to the logic of FIG. 4).

The text message 1100 shown in FIG. 11 may be spoken to a voice caller when the callee is not currently available to answer the phone. This example text may be generated programmatically, according to the present invention, when an incoming call is received while the callee's context event indicates that he is on vacation, out of the office, or is otherwise unavailable. Alternatively, the callee may be in the office but unable to answer the phone because of a specific event, such as attending a meeting. An implementation of the present invention preferably enables the user to specify the level of detail to be provided. For security reasons, for example, when the callee is out of the office for vacation or other reasons, the message might not identify the particular reason. Instead, the caller is informed that the callee is not in the office, and when he is scheduled to return (shown at 1110 and 1120) based upon the context event and specific event (if any) which are applicable to the date and time of the incoming call, as determined according to FIG. 5. As shown in this example, the callee's attribute information for the applicable context event and specific event (if any) have also been interrogated according to FIG. 5 to enable informing the caller as to whether, and how often, the callee normally checks for voice mail messages, as shown at 1130. If this callee's default preferences indicate that he checks his voice mail messages every 2 hours during the "out of office" context, for example, but he has overridden this context event to specify 4 hour intervals for a particular occurrence of being out of the office, or if a specific event is active for which the callee's preferences indicate that he is not checking voice mail messages at all, then the message content at 1130 will be revised accordingly.

The spoken message preferably gives the caller an option to be transferred to another person who has been identified (using a particular attribute value, for example) as a backup contact, as shown at 1140, and another option to hear dynamically generated information regarding alternative means of immediately contacting the callee (using an immediate contact attribute value such as that depicted in FIG. 7, for example), as shown at 1150. If one of these options is chosen, the attributes which this callee has previously entered (for example, using the GUI display panel in FIG. 7) will then be used to generate spoken information about the backup or the alternative contact means which are applicable to the callee's applicable context event and specific event (if any), where this information is determined according to the logic of FIG. 5. Optionally, an implementation of the present invention may provide for automatically forwarding the connection to the backup or an alternative contact.

ALTERNATIVE PREFERRED EMBODIMENT

The alternative preferred embodiment for evaluating calendared entries, and their attributes, will now be described with reference to FIGS. 12 through 14. This alternative embodiment evaluates calendar information in advance of detecting an incoming event, and may therefore provide better performance in terms of returning generated responses.

In this embodiment, a table (or other similar storage structure) is preferably created to contain information about calendar owners for some particular period of time. The information in this table is then used to respond to incoming e-mail or instant messages (or to requests for instant messaging status), incoming phone calls, etc. For purposes of discussion, it will be assumed that the evaluation period covered by the table entries is the current day plus the next day. A calendar monitoring agent periodically inspects information on the electronic calendars for a set of users, and creates entries in this table accordingly. Preferably, each user's stored electronic calendar includes a bit or flag indicating whether this calendar data has been processed by the calendar monitoring agent. Thus, at the start of each new evaluation period and when a user's calendar is subsequently changed within this evaluation period, the flag is reset and the calendar monitoring agent therefore knows whether each user's calendared events need to be (re-) evaluated. Preferably, the calendar monitoring agent is invoked periodically, using a timer-driven means for example, to inspect the calendar entries looking for those which need (re-)evaluation. The invocation may be performed at differing time intervals according to the needs of a particular implementation. For example, it may be necessary to re-analyze calendars of the employees of a large corporation every 15 minutes, or every 5 minutes, while another environment may find other intervals more effective. (Alternatively, the invocation may be event-driven, such as by detecting that a threshold number of calendar changes has occurred.)

Figure 12:
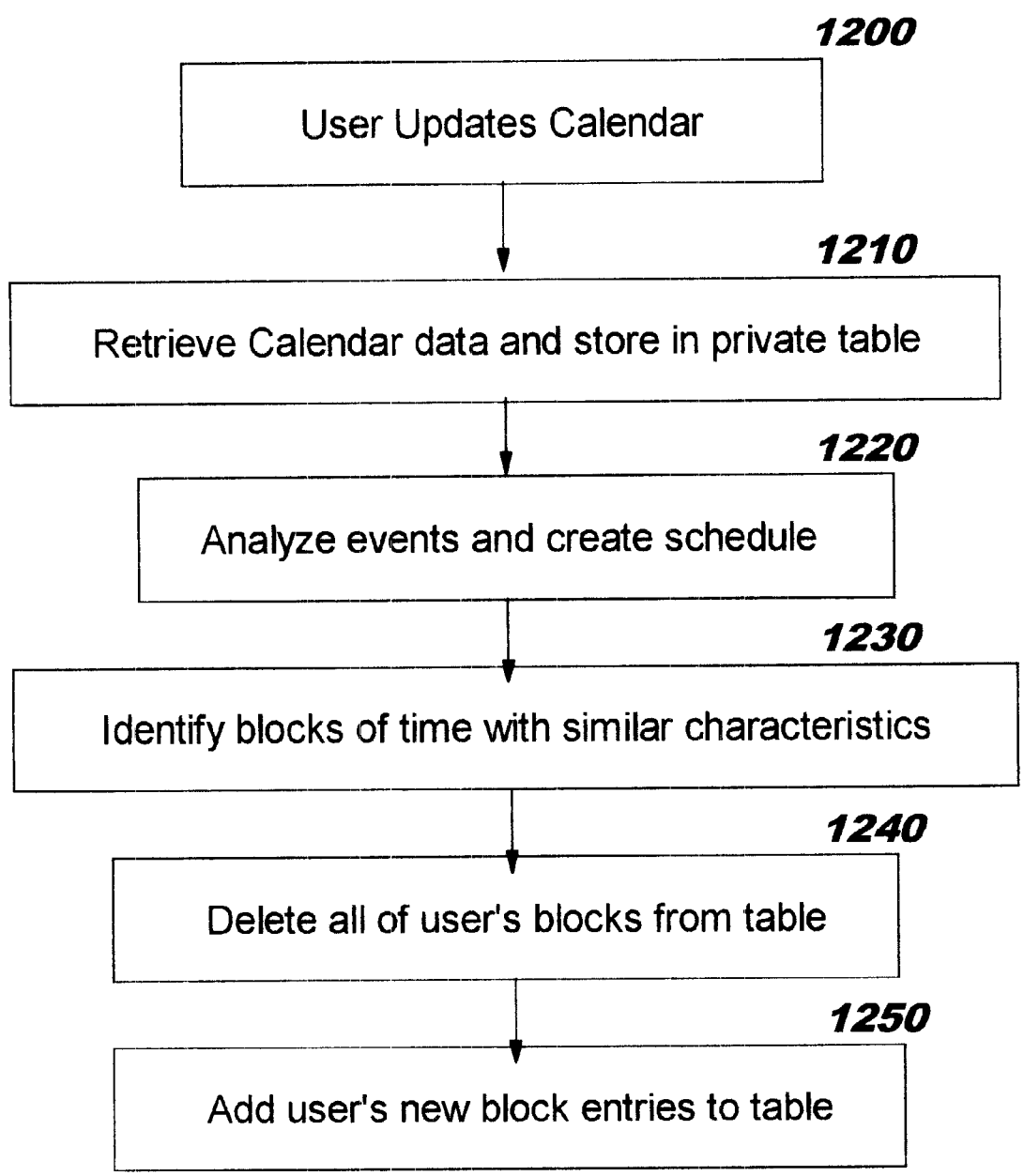
FIGS. 12 and 13 provide flow charts setting forth the logic that may be used to implement an alternative embodiment of the present invention.

Referring now to FIG. 12, after the user updates his electronic calendar (Block 1200), the revised data is preferably stored in a database table associated with this user (Block 1210). When the calendar monitoring agent is invoked, it receives or has access to this information for each user. To process a particular user's calendar data, the calendar monitoring agent locates the separate context event and specific event entries.

Using this located information, the table entries previously discussed are created (Block 1220). An example table 1400 is shown in FIG. 14. In the preferred embodiment, this table contains an entry for each set of different context event, specific event, and attribute settings throughout a 2-day period. (Entries may be purged once the corresponding time period has elapsed, however.) Each entry preferably contains a name or identifier of the person to which the entry pertains (element 1405); the person's phone number 1410 (in the case of a voice mail response); a starting time 1415 and ending time 1420 for each entry; a state indicator 1425; a status indicator 1430; and zero or more attribute fields such as how often the person is checking voice mail (or e-mail) in the time period reflected by this entry, shown in table 1400 as the "responsive" attribute 1435, and the most immediate way of contacting the person in this time period, as shown by the "immed" attribute 1440.

Preferably, separate tables are created for use with e-mail, voice mail, and instant messaging (to allow each table to be separately customized without impacting the others, for example). Thus, the phone number entry 1410 is replaced by an e-mail address or instant messaging identifier for which the table entries of the corresponding table are to be used. When an event occurs for which it is necessary to generate an automated response, the phone number or e-mail target address or instant messaging target address, as appropriate, is preferably used as an index to the corresponding table 1400 (using the information stored in column 1410) to locate the entry for the current time period based on the information stored in columns 1415 and 1420.

The entries in this table 1400 are created using a set of rules for evaluating calendar entries. The rules may be adapted to the needs of a particular implementation of the present invention (where those rules may be the same as, or different from, rules which are used in an implementation of the first preferred embodiment). One such set of rules will now be described. First, a user is defined to always be in a context, and may or may not be in a specific event. It is necessary to determine which context and specific event (if scheduled) apply to the person for each moment of the day. If a user has scheduled overlapping context events, then the context with the later start time preferably takes precedence during the overlap. If multiple contexts are scheduled with the same start time, then another suitable conflict resolution technique may be used to determine which context takes precedence during the overlap. Similar analysis is preferably performed for specific events. Some types of context events, such as those which were previously described as being a category of "Out" events (i.e. Vacation, Holiday, Illness) may be defined for which all other events are ignored during this evaluation. If priority values have been assigned to the calendared events, as previously discussed, then apparent conflicts are preferably resolved using these priorities; when events of equal priority conflict, the rules may be applied using start time or another conflict resolution technique, as just described.

The user's calendar is then broken up into blocks of contiguous time (Block 1230 of FIG. 12), where each block has the same characteristics (i.e. the same context, specific event, and attribute values). When separate tables are created for voice mail, e-mail, and instant messages, the blocks are determined using only those attributes which are pertinent to that table. For example, if a user's calendar indicates that he (1) normally arrives for work at 8 a.m. and (2) leaves at 5 p.m., (3) has a meeting scheduled from 9 am. to 11 a.m., and (4) goes to lunch between 11:30 am. and 12:30 p.m., then the blocks of time will be from 8 to 9, 9 to 11, 11 to 11:30, 11:30 to 12:30, and 12:30 to 5. Blocks are also preferably created for the user's outside working hours periods, so another block for this user begins at midnight of the evaluation period and ends at 8 a.m. (assuming the user's attribute values are identical through this time period), and one or more other blocks represent the user's status after he leaves work at 5 p.m. If more than one day is to be represented by the entries in the table(s), the calendar entries for the additional days are similarly processed to determine the contiguous blocks.

The following rules may be used to determine that a block should be ended, and a new block should begin: (1) the user's context is in the office or at an alternate work location, and a specific event ends without another specific event following; (2) the user's context is in the office or at an alternate work location, and a specific event begins when there was no preceding specific event; (3) the user changes from one specific event to another specific event having different attribute values (for example, changing from lunch, where the immediate means of contact is a pager, to a meeting, where the immediate means may be the user's secretary); and (4) an event (either context or specific) is scheduled outside the user's normal working hours. (It should be noted that these are merely representative rules that may be used.)

Figure 13:
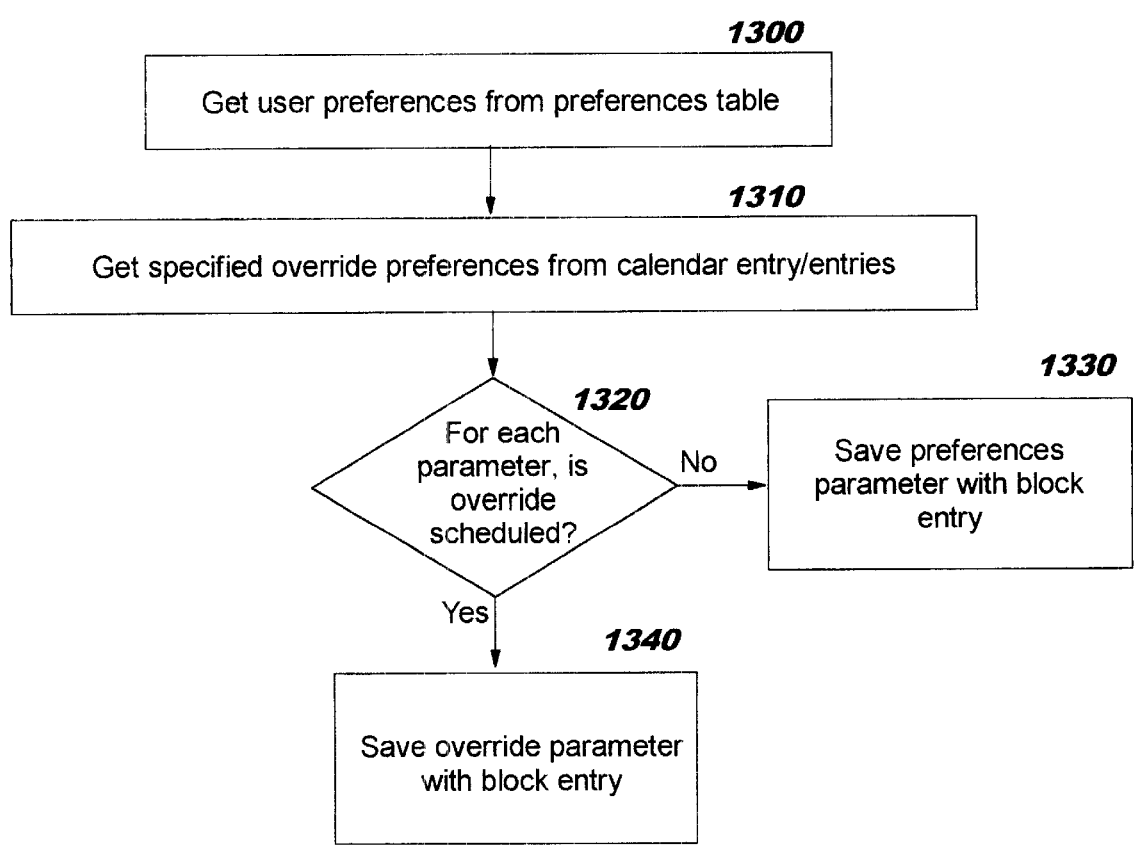

The process shown in FIG. 13 may be used to determine the attribute values for the purpose of determining the contiguous blocks created by Block 1230. As shown in FIG. 13, the user's default preferences are retrieved (Block 1300), as are any overrides which have been created for particular instances of calendared events (Block 1310). For each attribute type to be reflected in table 1400, Block 1320 checks to see if there is a corresponding override. If not, then an indicator reflecting the default attribute value is stored in the table (Block 1330); otherwise, an indicator reflecting the override value is stored (Block 1340). As shown in columns 1435 and 1440 of the example table 1400, these indicators are preferably short numerical values that are defined to represent a particular predefined value. For example, an entry of "2" for the responsive attribute 1435 may indicate that this person checks his voice mail every 2 hours, while an entry of "0" may indicate that he is not checking voice mail at all, and so forth. While only short numerical settings are shown in FIG. 14, additional or different types of information may be used. As an example, for the most immediate means of contact attribute 1435, additional information (such as the person's cellular phone number or pager number, when applicable) is preferably stored as another field in table 1400 to optimize retrieval of that information when needed.

Returning now to the discussion of FIG. 12, upon creating the contiguous blocks of time for a particular user, any previously-existing entries in table 1400 for this user are preferably deleted (Block 1240) and the new entries are added (Block 1250). This technique enables efficiently accommodating any changes that may be made throughout the day as the user's calendar entries change. The processing of FIG. 12 is then repeated for the next user, until table 1400 reflects all the users for which the calendar monitoring agent is responsible.

As has been demonstrated, the present invention discloses advantageous techniques for more fully exploiting information on electronic calendars through use of a multi-level hierarchy of events and related attribute values for those events. Personal assistant applications can therefore better serve their users with automated, dynamically-generated information which accounts for the context of the calendar events.

A number of optional enhancements may be made in an implementation of the present invention, using the teachings which have been disclosed. For example, sender-specific filtering may be applied to incoming events, whereby the automated response is programmatically adapted based on an identification of the sender. A calendar user may designate certain individuals, or perhaps groups of individuals, who are to receive particular details while other senders are to receive a more generic response. The manner in which this filtering can be added to an implementation will be obvious to one of ordinary skill in the art.

Although the preferred embodiments are described herein in terms of predetermined context and specific event types, the disclosed techniques are easily adaptable to systems which provide for information of this type to be defined by a user (enabling use of event types which are tailored to the needs of an environment in which the present invention operates). In this case, the user-defined event type names are programmatically associated with attribute values for those names.

Furthermore, the disclosed techniques may be used advantageously for providing a general service in which the specific meaning and/or use of the information differs from that which has been described above.

While the preferred embodiments of the present invention has been described, additional variations and modifications in those embodiments may occur to those skilled in the art once they learn of the basic inventive concepts. Therefore, it is intended that the appended claims shall be construed to include both the first preferred embodiment and the alternative embodiment, and all such variations and modifications as fall within the spirit and scope of the invention.

What is claimed:

1. A computer program product embodied on one or more computer-readable media, the computer program product adapted for using calendar events and information from an electronic calendar to prepare responses to incoming events and comprising:
   computer-readable program code means for creating calendar events on an electronic calendar, the calendar events being organized according to a multi-level hierarchy comprising context events at an upper level of the hierarchy and specific events at a lower level of the hierarchy, wherein zero or more specific events may be scheduled on the electronic calendar during any particular context event;
   computer-readable program code means for analyzing the calendar events created for one or more users, in preparation for receiving incoming events for the users, to determine information about the users for a particular period of time;
   computer-readable program code means for storing the determined information;
   computer-readable program code means for retrieving, upon occurrence of an incoming event for a selected one of the users, the stored information for the selected user; and
   computer-readable program code means for using the retrieved information to automatically respond to the incoming event.

2. The computer program product according to claim 1, wherein the computer-readable program code means for analyzing further comprises computer-readable program code means for automatically applying a default context during calendar periods when no other context event is active.

3. The computer program product according to claim 1, wherein the incoming event is detecting arrival of an electronic mail message for the selected user while the stored information for the selected user indicates that he is not currently available for checking his electronic mail.

4. The computer program product according to claim 3, wherein the automatic response comprises a notification informing a sender of the electronic mail message of the selected user's current status, as determined from the stored information for the selected user.

5. The computer program product according to claim 1, wherein the incoming event is detecting arrival of an instant message or a request for an instant messaging status for the selected user while the stored information for the selected user indicates that he is not currently available for instant messaging.

6. The computer program product according to claim 5, wherein the automatic response comprises a notification informing a sender of the instant message or a requester of the instant messaging status of the selected user's current status, as determined from the stored information for the selected user.

7. The computer program product according to claim 1, wherein the incoming event is detecting an incoming voice call for the selected user where the selected user does not answer the incoming voice call.

8. The computer program product according to claim 7, wherein the automatic response comprises a notification informing a caller making the incoming voice call of the selected user's current status, as determined from the stored information for the selected user.

9. The computer program product according to claim 1, wherein the incoming event is receiving a request for project management information and wherein the computer-readable program code means for retrieving retrieves the stored information for a plurality of users, upon occurrence of the request, to provide information about the context events and specific events scheduled for the users at a target date and a target time period specified in the received request.

10. The computer program product according to claim 9, wherein the request asks whether any team member is available at a particular location during the target a time period on the target date.

11. The computer program product according to claim 1, wherein zero or more attribute values may be specified for each of the context events and each of the specific events.

12. The computer program product according to claim 11, wherein the computer-readable program code means for analyzing further comprises:
   computer-readable program code means for analyzing, for each of the users the specified attribute value of each context event and of any specific events that are applicable during the particular period of time; and
   computer-readable program code means for reflecting the analyzed attribute values in the stored information.

13. The computer program product according to claim 1, wherein:
   zero or more attribute values may be specified for each of the context events and each of the specific events;
   the computer-readable program code means for analyzing further comprises computer-readable program code means for determining, for each of the one or more users, when a distinct set of context event, specific event, and attribute values applies; and
   the computer-readable program code means for storing further comprises computer-readable program code means for storing a distinct entry for each of the distinct sets.

14. The computer program product according to claim 13, wherein overrides may be specified for the attribute values and wherein the computer-readable program code means for analyzing further comprises computer-readable program code means for applying the overrides to the attribute values prior to operation of the computer-readable program code means for determining.

15. The computer program product according to claim 1, wherein:
   zero or more attribute values may be specified for each of the context events;
   the computer-readable program code means for analyzing further comprises computer-readable program code means for determining, for each of the one or more users, when a distinct set of context event and attribute values applies; and
   the computer-readable program code means for storing further comprises computer-readable program code means for storing a distinct entry for each of the distinct sets.

16. The computer program product according to claim 15, wherein overrides may be specified for the attribute values and wherein the computer-readable program code means for analyzing further comprises computer-readable program code means for applying the overrides to the attribute values prior to operation of the computer-readable program code means for determining.

17. The computer program product according to claim 1, wherein default attribute values may be specified for context event types and for specific event types, and wherein a particular context event and/or a particular specific event may include attribute values which override the default attribute values and wherein the computer-readable program code means for analyzing further comprises computer-readable program code means for applying the overrides to the default attribute values.

18. The computer program product according to claim 12, wherein the attribute values include information on how to immediately contact the selected user.

19. The computer program product according to claim 12, wherein the attribute values include whether, and how often, the selected user checks electronic mail messages.

20. The computer program product according to claim 12, wherein the attribute values include whether the selected user is available for instant messaging.

21. The computer program product according to claim 12, wherein the attribute values include whether, and how often, the selected user checks voice mail messages.

22. A system for using calendar events and information from an electronic calendar to prepare responses to incoming events, comprising:
    means for creating calendar events on an electronic calendar, the calendar events being organized according to a multi-level hierarchy comprising context events at an upper level of the hierarchy and specific events at a lower level of the hierarchy, wherein zero or more specific events may be scheduled on the electronic calendar during any particular context event;
    means for analyzing the calendar events created for one or more users, in preparation for receiving incoming events for the users, to determine information about the users for a particular period of time;
    means for storing the determined information;
    means for retrieving, upon occurrence of an incoming event for a selected one of the users, the stored information for the selected user; and
    means for using the retrieved information to automatically respond to the incoming event.

23. The system according to claim 22, wherein the means for analyzing further comprises means for automatically applying a default context during calendar periods when no other context event is active.

24. The system according to claim 22, wherein the incoming event is one of: (1) detecting arrival of an electronic mail message for the selected user while the stored information for the selected user indicates that he is not currently available for checking his electronic mail; (2) detecting arrival of an instant message for the selected user, or (3) receiving a request for instant messaging status for the selected user, while the stored information for the selected user indicates that he is not currently available for instant messaging; or (4) detecting an incoming voice call for the selected user where the selected user does not answer the incoming voice call.

25. The system according to claim 24, wherein the automatic response comprises a notification informing a sender of the electronic mail message or the instant message, a caller making the incoming voice call, or a requester of the instant messaging status of the selected user's current status, as determined from the stored information for the selected user.

26. The system according to claim 22, wherein the incoming event is receiving a request for project management information and wherein the means for retrieving retrieves stored information for a plurality of users, upon occurrence of the request, to provide information about the context events and specific events scheduled for the users at a target date and a target time period specified in the received request.

27. The system according to claim 26, wherein the request asks whether any team member is available at a particular location during the target time period on the target date.

28. The system according to claim 22, wherein zero or more attribute values may be specified for each of the context events and each of the specific events.

29. The system according to claim 28, wherein the means for analyzing further comprises:
    means for analyzing, for each of the users, the specified attribute value of each context event and of any specific events that are applicable during the particular period of time; and
    means for reflecting the analyzed attribute values in the stored information.

30. The system according to claim 22, wherein:
    zero or more attribute values may be specified for each of the context events and each of the specific events;
    the means for analyzing further comprises means for determining, for each of the one or more users, when a distinct set of context event, specific event, and attribute values applies; and
    the means for storing further comprises means for storing a distinct entry for each of the distinct sets.

31. The system according to claim 30, wherein overrides may be specified for the attribute values and wherein the means for analyzing further comprises means for applying the overrides to the attribute values prior to operation of the means for determining.

32. The system according to claim 22, wherein default attribute values may be specified for context event types and for specific event types, and wherein a particular context event and/or a particular specific event may include attribute values which override the default attribute values and wherein the means for analyzing further comprises means for applying the overrides to the default attribute values.

33. The system according to claim 29, wherein the attribute values include one or more of: (1) information on how to immediately contact the selected user; (2) whether, and how often, the selected user checks electronic mail messages; (3) whether the selected user is available for instant messaging; (4) whether, and how often, the selected user checks voice mail messages; and (5) an alternative contact person for the selected user.

34. A method for using calendar events and information from an electronic calendar to prepare responses to incoming events, comprising the steps of:
    creating calendar events on an electronic calendar, the calendar events being organized according to a multi-level hierarchy comprising context events at an upper level of the hierarchy and specific events at a lower level of the hierarchy, wherein zero or more specific events may be scheduled on the electronic calendar during any particular context event;
    analyzing the calendar events created for one or more users, in preparation for receiving incoming events for the users, to determine information about the users for a particular period of time;
    storing the determined information;
    retrieving, upon occurrence of an incoming event for a selected one of the users, the stored information for the selected user; and
    using the retrieved information to automatically respond to the incoming event.

35. The method according to claim 34, wherein the analyzing step further comprises the step of automatically applying a default context during calendar periods when no other context event is active.

36. The method according to claim 34, wherein the incoming event is one of: (1) detecting arrival of an electronic mail message for the selected user while the stored information for the selected user indicates that he is not currently available for checking his electronic mail; (2) detecting arrival of an instant message for the selected user while the stored information for the selected user indicates that he is not currently available for instant messaging; (3) detecting an incoming voice call for the selected user where the selected user does not answer the incoming voice call; or (4) receiving a request for instant messaging status for the selected user while the stored information for the selected user indicates that he is not currently available for instant messaging.

37. The method according to claim 36, wherein the automatic response comprises a notification informing a sender of the electronic mail message or the instant message, a caller making the incoming voice call, or a requester of the instant messaging status of the selected user's current status, as determined from the stored information for the selected user.

38. The method according to claim 34, wherein the incoming event is receiving a request for project management information and wherein the retrieving step retrieves stored information for a plurality of users, upon occurrence of the request, to provide information about the context events and specific events scheduled for the users at a target date and a target time period specified in the received request.

39. The method according to claim 38, wherein the request asks whether any team member is available at a particular location during the target time period on the target date.

40. The method according to claim 34, wherein zero or more attribute values may be specified for each of the context events and each of the specific events.

41. The method according to claim 40, wherein the analyzing step farther comprises the steps of:

analyzing, for each of the users, the specified attribute value of each context event and of any specific events that are applicable during the particular period of time; and reflecting the analyzed attribute values in the stored information.

42. The method according to claim 34, wherein:

zero or more attribute values may be specified for each of the context events and each of the specific events;

the analyzing step further comprises the step of determining, for each of the one or more users, when a distinct set of context event, specific event, and attribute values applies; and the storing step further comprises the step of storing a distinct entry for each of the distinct sets.

43. The method according to claim 42, wherein overrides may be specified for the attribute values and wherein the analyzing step further comprises the step of applying the overrides to the attribute values prior to operation of the determining step.

44. The method according to claim 34, wherein default attribute values may be specified for context event types and for specific event types, and wherein a particular context event and/or a particular specific event may include attribute values which override the default attribute values and wherein the analyzing step further comprises the step of applying the overrides to the default attribute values.

45. The method according to claim 41, wherein the attribute values include one or more of: (1) information on how to immediately contact the selected user; (2) whether, and how often, the selected user checks electronic mail messages; (3) whether the selected user is available for instant messaging; (4) whether, and how often, the selected user checks voice mail messages; and (5) an alternative contact person for the selected user.

46. The method according to claim 42, wherein a level of detail provided in the automatic response varies, based on an identification of a sender of the incoming event.

47. The method according to claim 34, wherein:

the incoming event is a request for analyzing selected ones of the specific events for one or more of the users; and the retrieving step further comprises the step of retrieving, for the one or more users, the stored information matching the selected ones.

48. The method according to claim 34, wherein:

the incoming event is a request for analyzing selected ones of the context events for one or more of the users; and the retrieving step further comprises the step of retrieving, for the one or more users, the stored information matching the selected ones.

49. The method according to claim 40, wherein:

the incoming event is a request for analyzing selected ones of the attribute values for one or more of the users; and the retrieving step further comprises the step of retrieving, for the one or more users, the stored information matching the selected ones.

* * * * *